(12) United States Patent
Nichtawitz et al.

(10) Patent No.: US 6,729,843 B1
(45) Date of Patent: May 4, 2004

(54) PARTIAL SPLITTER VANE FOR REACTION HYDRAULIC TURBINE

(75) Inventors: Alois Nichtawitz, Traun (AT); Christian Karl Angerer, Aschach (AT); Stuart Thomas Coulson, Quebec (CA)

(73) Assignees: General Electric Canada Inc., Ontario (CA); VA Tech Hydro GmbH & Co., Vienna (AT)

( * ) Notice: Subject to any disclaimer, the term of this patent is extended or adjusted under 35 U.S.C. 154(b) by 140 days.

(21) Appl. No.: 10/030,100
(22) PCT Filed: Jul. 31, 2000
(86) PCT No.: PCT/EP00/07396
§ 371 (c)(1),
(2), (4) Date: Jan. 17, 2002
(87) PCT Pub. No.: WO01/11234
PCT Pub. Date: Feb. 15, 2001

(30) Foreign Application Priority Data

Aug. 6, 1999 (CA) .............................................. 2279682

(51) Int. Cl.$^7$ ................................................. F01D 1/02
(52) U.S. Cl. ................. 415/211.2; 415/183; 415/208.1; 138/39; 428/410
(58) Field of Search ............................. 415/211.2, 183, 415/208.1; 138/39; 428/410

(56) References Cited

U.S. PATENT DOCUMENTS

| 1,467,168 A | 9/1923 | Kaplan |
| 1,671,898 A | * 5/1928 | Gingerich |
| 2,060,101 A | 11/1936 | Moody |
| 3,033,491 A | * 5/1962 | Clark |
| 3,047,267 A | 7/1962 | Peyrin |
| 3,940,097 A | 2/1976 | Wilson et al. |
| 4,174,083 A | * 11/1979 | Mohn ........................ 244/35 R |
| 4,232,710 A | * 11/1980 | Gallo et al. .................... 138/39 |
| 4,302,151 A | 11/1981 | Piguet et al. |
| 4,360,432 A | * 11/1982 | Kieronski .................... 210/402 |
| 4,515,524 A | 5/1985 | Fisher, Jr. |
| 4,648,244 A | 3/1987 | Mayo, Jr. et al. |
| 4,884,917 A | * 12/1989 | Christiansen ................. 405/80 |
| 5,213,138 A | 5/1993 | Presz, Jr. |
| 5,230,369 A | 7/1993 | Presz, Jr. |
| 5,327,940 A | 7/1994 | Presz, Jr. |
| 5,531,484 A | * 7/1996 | Kawano ..................... 285/156 |

FOREIGN PATENT DOCUMENTS

FR 2300909 9/1976

* cited by examiner

Primary Examiner—Edward K. Look
Assistant Examiner—J. M. McAleenan
(74) Attorney, Agent, or Firm—Greenblum & Bernstein, P.L.C.

(57) ABSTRACT

Reaction hydraulic turbine that includes a draft tube having side walls arranged to define an inlet and an outlet and an elbow arranged to position the outlet substantially perpendicular to the inlet. A turbine runner is positioned adjacent the inlet and the outlet is arranged to define a flow exit, and a splitter vane is mounted within the draft tube to partially extend across a width of the draft tube. In this manner, flow is redirected about the elbow of the draft tube. The splitter vane includes opposing side edge surfaces that are spaced from the side walls, such that swirl flow is permitted around the splitter vane within the draft tube.

37 Claims, 4 Drawing Sheets

PARTIAL SPLITTER VANE FOR REACTION HYDRAULIC TURBINE

CROSS-REFERENCE TO RELATED APPLICATIONS

The present application is a U.S. National Stage of International Application PCT/EP00/07396 filed Jul. 31, 2000 and claims priority under 35 U.S.C. §119 of Canadian Patent Application No. 2 279 682 filed Aug. 6, 1999.

BACKGROUND OF THE INVENTION

TECHNICAL FIELD OF THE INVENTION

The present invention relates to a reaction hydraulic turbine draft tube. In particular, the present invention relates to elbow type draft tubes having a splitter vane.

BACKGROUND OF THE INVENTION

In a reaction hydraulic turbine, a draft tube is the portion of the flow passage between the exit of the turbine runner and the exit of the turbine. The purpose of the draft tube in a reaction hydraulic turbine is to recover a portion of the energy left in the flow at the runner exit. The draft tube outlet cross-sectional area is larger than that at the inlet. This results in typically lower outlet velocities than inlet velocities. It is desirable to minimize the kinetic energy left in the flow at the exit of the draft tube since most of this energy is lost when the flow exits the draft tube.

Many draft tubes must turn the flow by 90 degrees or more, since the draft tube inlet flow is typically vertical and the outlet flow is typically horizontal. In small turbines the flow may be opposite. Such draft tubes are commonly known as elbow type draft tubes.

One of the problems inherent in many previous draft tube designs is that the flow can separate from the profile of the draft tube as it is being redirected. This flow separation can result in a substantial loss in the efficiency of the turbine. Splitter vanes, sometimes called flow splitters, have been used in the past to improve the performance of poor draft tube designs. Poor performance is especially noticeable at operating points where the flow rate is greater than the flow rate at the peak efficiency point for a given head.

The conventional splitter vane extends across the entire width of the draft tube and is anchored in the draft tube side walls. The splitter vane is located in the draft tube adjacent the elbow to force the water fluid passing through the draft tube to change direction. Such a splitter vane for an elbow shaped draft tube is disclosed in U.S. Pat. No. 1,467,168 issued Sep. 4, 1923 to Victor Kaplan. Alternatively, U.S. Pat. No. 2,060,101 issued Nov. 10, 1936 to Lewis Moody discloses mounting the flow splitter vane across the draft tube and anchoring the flow splitter to the side walls of the draft tube and a central pier extending longitudinally along the draft tube.

While the use of flow splitter vanes improves performance, such flow splitter vanes do not facilitate the natural swirling flow of the water through the draft tube. The longitudinal extending piers further compound this problem. The flow at the exit of a turbine runner is by nature a typically swirling flow especially at flow rates below the flow rate corresponding to the peak efficiency for a given operating head. The use of a conventional splitter vane results in a decrease in draft tube efficiency for these part load conditions due to the resulting blockage of the swirl component of the flow. The conventional splitter vane is not feasible for large turbines since it results in a very large structure subject to very high static and dynamic loads due to the large surface area of the splitter vane extending across the entire width of the draft tube and impeding the natural swirl or vortex flow through the draft tube at flow rates below peak efficiency.

There is a need for a draft tube having a flow splitter vane that does not result in any efficiency decrease for flow rates below peak efficiency flow rates and that still provides the full benefits at flow rates above the peak efficiency flow rate for a given head.

SUMMARY OF THE INVENTION

The present invention relates to a splitter vane mounted within an elbow shaped draft tube of a reaction hydraulic turbine that partially extends across the width of the draft tube to redirect flow about said elbow in the draft tube. The splitter vane has opposing side edge surfaces spaced from the side walls of the draft tube to permit swirl flow around the splitter vane within the draft tube. Such a splitter vane is referred to throughout the disclosure as a "partial splitter vane".

The partial splitter vane of the present invention does not extend across the full width of the draft tube allowing the peripheral flow to swirl around the splitter as it moves through the draft tube.

The partial splitter vane does not result in any efficiency decrease for these operating conditions below peak efficiency flow rates and still provides the full benefits at flow rates above the peak efficiency flow rate for a given head.

The partial splitter vane is significantly smaller than a conventional splitter vane that extends across the entire width of the draft tube and this results in much lower static and dynamic loads due to its smaller surface area and minimal blockage of the swirl component of the flow by the partial splitter vane. This makes it feasible to use a partial splitter vane on large turbines as well as small turbines.

In accordance with the present invention the splitter vane may extend across less than about 80% of the width of the draft tube. Preferably the width of the splitter vane extends between 50 and 80 percent of the width of the draft tube and has its opposing side edges spaced substantially the same distance from an adjacent one of the side walls of the draft tube. The opposing side edge surfaces of the splitter vane may diverge from one another in the direction of flow towards the outlet of the draft tube.

Preferably, the draft tube includes a plurality of support posts embedded at one end in the draft tube and connected at the other end to position the splitter vane in non-contacting relation with the side walls of the draft tube. Preferably the support posts are mounted to a lower surface of the splitter vane. The support posts are surrounded by tubes shaped to minimize the effects of the posts on the flow within the draft tube. The draft tube preferably includes at least one pier adjacent the outlet extending into the draft tube. Preferably, the splitter vane further includes at least one pier receiving recess adapted to receive the pier and to support the splitter vane on the pier. In the preferred embodiment the splitter vane is offset across the width of, and to one side of, the draft tube.

In accordance with one aspect of the present invention there is provided a draft tube for use in a turbine having a turbine runner. The draft tube comprises side walls having an inlet for positioning adjacent the turbine runner and an outlet defining a flow exit for the turbine. The side walls of the draft tube diverge in width between the inlet and the outlet. The draft tube has a curved elbow to position the outlet substantially perpendicular to the inlet. The draft tube has a splitter vane mounted within the draft tube extending about the elbow and partially extending across the width of the draft tube to redirect flow about said elbow in the draft tube. The splitter vane has opposing side edge surfaces spaced from the side walls to permit swirling flow around the splitter vane within the draft tube.

The present invention is directed to a reaction hydraulic turbine that includes a draft tube having side walls arranged to define an inlet and an outlet and an elbow arranged to position the outlet substantially perpendicular to the inlet. A turbine runner is positioned adjacent the inlet and the outlet being arranged to define a flow exit, and a splitter vane is mounted within the draft tube to partially extend across a width of the draft tube, so that flow is redirected about the elbow of the draft tube. The splitter vane has opposing side edge surfaces that are spaced from the side walls, such that swirl flow is permitted around the splitter vane within the draft tube.

In accordance with a feature of the invention, the draft tube has a diverging width between the inlet and the outlet.

According to another feature of the invention, the splitter vane extends across less than about 80% of the width of the draft tube.

Further, the opposing side edge surfaces of the sputter vane are arranged to diverge from one another in a flow direction toward the outlet.

The width of the splitter vane extends between 50% and 80% the width of the draft tube and the opposing side edges are spaced substantially a same distance from respective adjacent side walls of the draft tube.

Moreover, the draft tube further includes a plurality of support posts, in which one end of the plurality of support posts are embedded in the draft tube and an other end of the plurality of support posts are connected to the splitter vane to position the splitter vane in non-contacting relation with the side walls of the draft tube. The plurality of support posts are surrounded by tubes shaped to minimize effects of the plurality of posts on the flow within the draft tube. The support posts are mounted to a lower surface of the splitter vane.

The reaction hydraulic turbine further includes at least one pier positioned adjacent the outlet and to extend into the draft tube and a plurality of support posts having one end embedded in the draft tube and an other end connected to position the splitter vane in the draft tube. The splitter vane further includes at least one recess structured and arranged to receive the at least one pier, such that the splitter vane is supported on the pier. The support posts are surrounded by tubes shaped to minimize effects of the posts on the flow within the draft tube. The support posts are mounted to a lower surface of the splitter vane.

In accordance with a further feature of the present invention, the splitter vane is mounted offset across the width of the draft tube.

The present invention is directed to an apparatus including an elbow tube having an inlet end and an outlet end, and a splitter vane comprising vane edges spaced from an interior surface of the elbow tube.

According to a feature of the invention, the elbow tube has an interior width that increases between the inlet and the outlet.

Further, in a region of the splitter vane, a width of the interior surface increases. The splitter vane is structured to substantially correspond to the width increase of the interior surface.

In accordance with another feature of the instant invention, the splitter vane extends across less than 80% of an interior width in a region of the splitter vane. Further, the splitter vane extends across more than 50% of the interior width in the region of the splitter vane.

According to still another feature of the present invention, the vane edges are arranged to diverge from each other in a flow direction.

The apparatus further includes at least one support post arranged to couple the splitter vane to the elbow tube. The at least one support post is surrounded by a tube structured to minimize effects of on a flow within the elbow tube.

The apparatus further includes at least one pier coupled to an end of the splitter vane adjacent the outlet. The at least one pier is structured and arranged to extend through the outlet. Further, the splitter vane includes at least one recess structured and arranged to receive the at least one pier. Still further, at least one support post is arranged to couple the splitter vane to the elbow tube. The at least one support post is surrounded by a tube structured to minimize effects of on a flow within the elbow tube.

BRIEF DESCRIPTION OF THE DRAWINGS

For a better understanding of the nature and objects of the present invention reference may be had, by way of example, to the following detailed description when taken in conjunction with the accompanying diagrammatic drawings wherein.

DETAILED DESCRIPTION OF EMBODIMENTS

Figure 1:
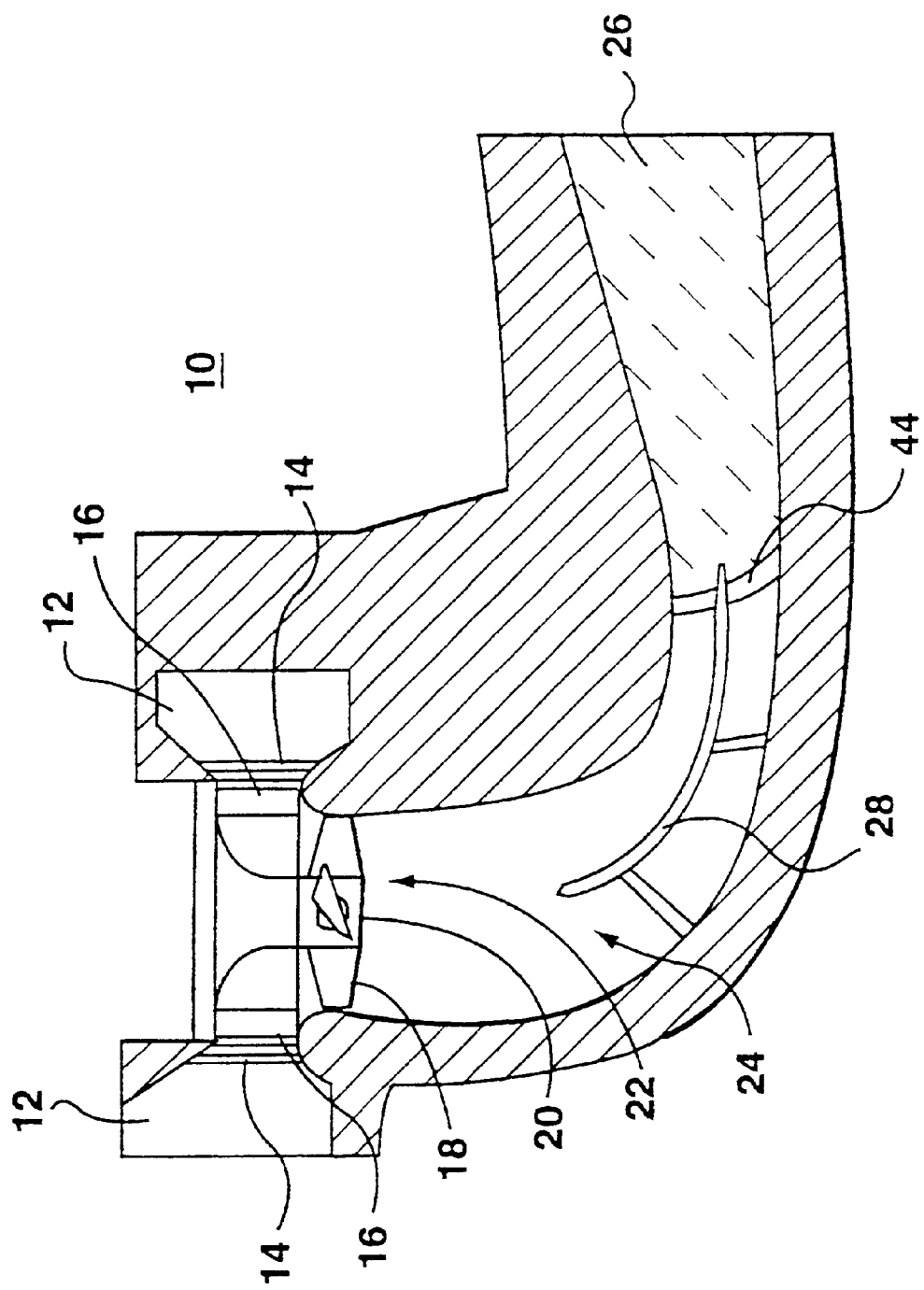
FIG. 1 is a side sectional view of a reaction hydraulic turbine including a draft tube and the partial flow splitter of the present invention.

Referring to FIG. 1 there is shown reaction hydraulic turbine 10. Turbine 10 includes a casing 12 throughwhich water enters the turbine 10. The water passes through stay vanes 14 and wicket gates 16 and past the turbine runner 18 mounted on a rotatable hub 20.

The water passes from the turbine runner 18 to the inlet 22 of an elbow draft tube 24. Water flow is gradually directed to horizontal discharge outlet 26 of the draft tube 24. The draft tube 24 is usually constructed of a reinforced concrete and the upper part has a metal or cast plated covering. Located within the draft tube 24 adjacent the elbow of the draft tube, is a partial splitter vane 28.

Figure 2:
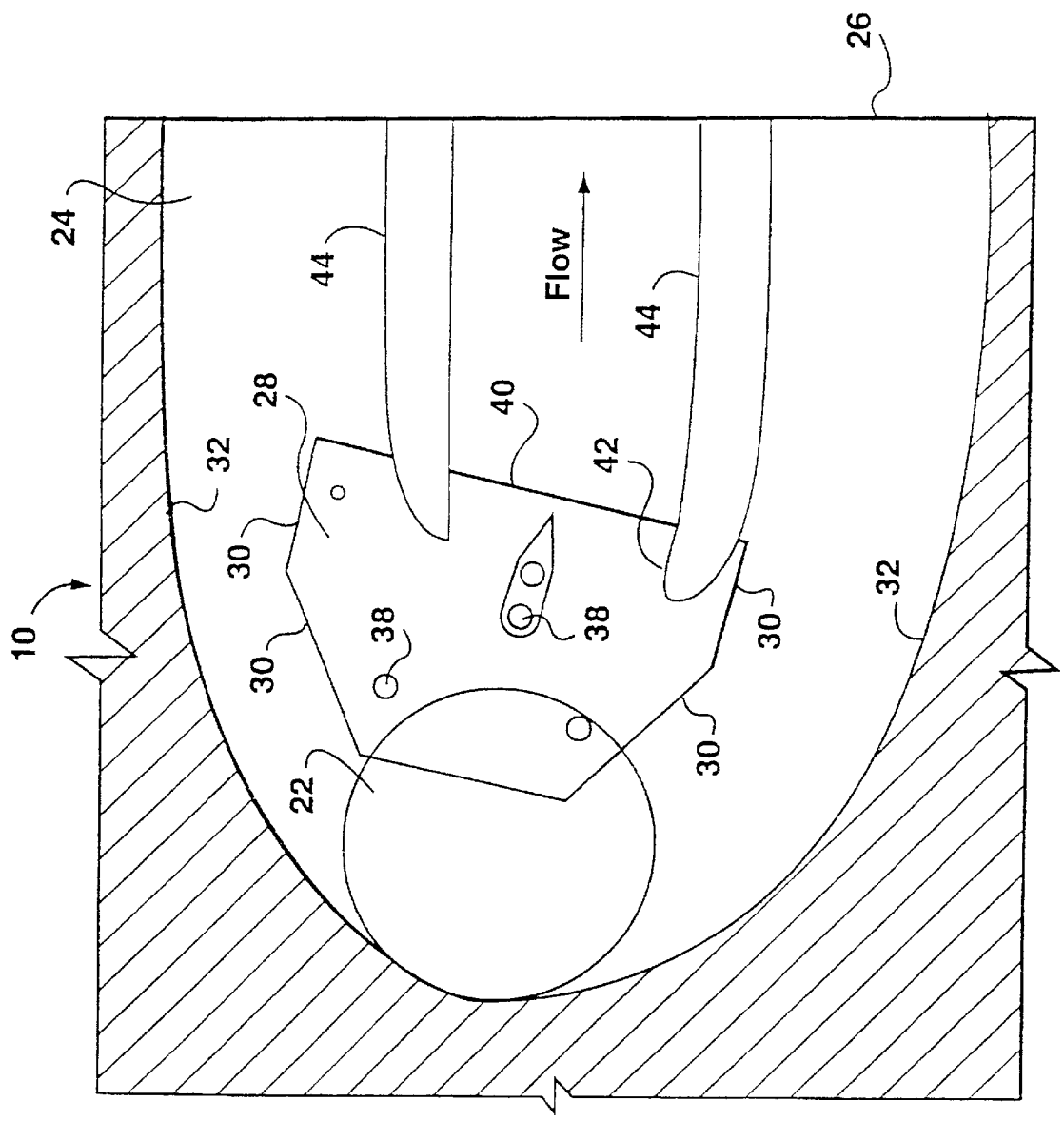
FIG. 2 is a plan view of the partial flow splitter mounted within the draft tube.
Figure 3:
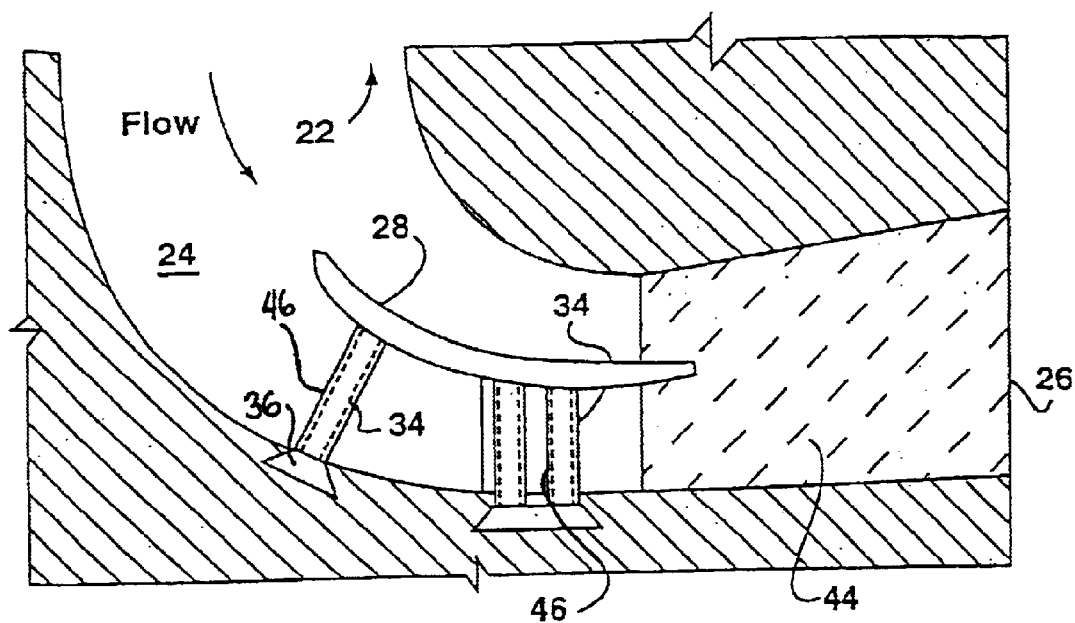
FIG. 3 is an enlarged side sectional view illustrating the partial flow splitter mounted within the draft tube.
Figure 4:
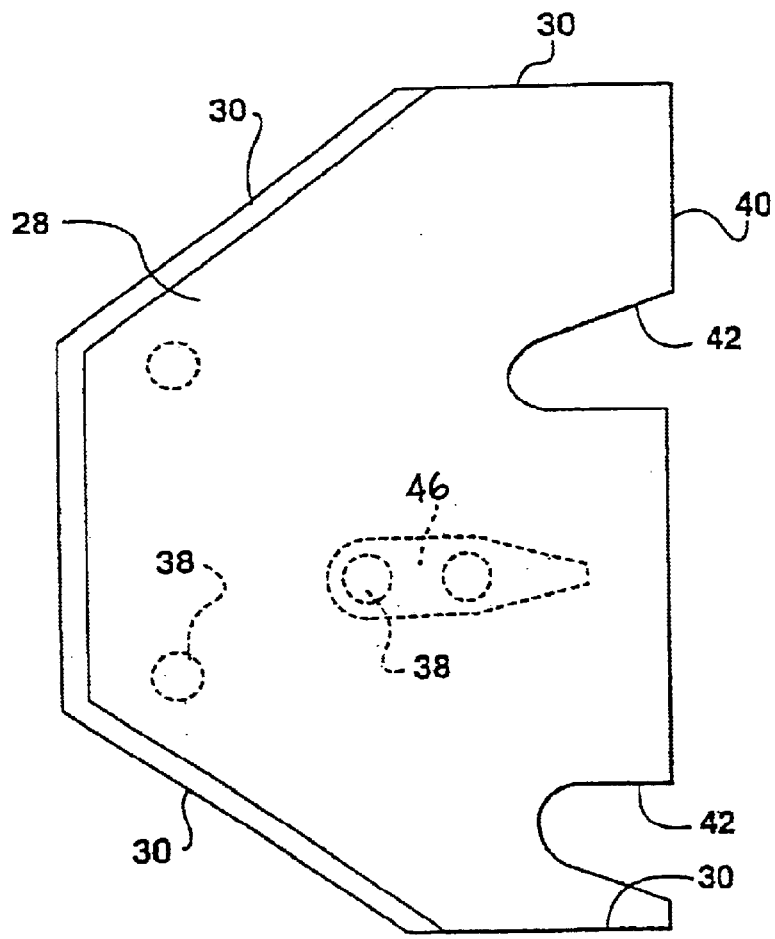
FIG. 4 is a plan view of the partial flow splitter.

Referring to FIGS. 1 through 4, the partial splitter vane 28 is mounted within the draft tube 24, partially extending across the width of the draft tube 24, to redirect flow about the elbow in the draft tube 24. The splitter vane 28 has opposing side edge surfaces 30 that are spaced from the side walls 32 of the draft tube 24 by predetermined distances to permit swirling flow around the splitter vane 28 within the draft tube 24. The splitter vane 28 extends across less than about 80% of the width of the draft tube 24. In the preferred embodiment shown, the splitter vane 28 extends slightly more than 50% of the width of the draft tube 24. The splitter vane 28 has its opposed side edge surfaces 30 each spaced from the side walls 32 of the draft tube 24 so that the splitter vane 28 is offset across the width of the draft tube 24 as best seen in FIG. 2. The side edge surfaces 30 are preferably rounded edges and preferably comprise piping. In FIGS. 2 and 4 the splitter vane 28 has diverging walls 30 that follow the divergence of the draft tube side walls 32.

The splitter vane 28 is mounted on support posts 34 which have one end thereof 36 connected to and embedded in the lower concrete wall of the draft tube 24. The other end of the posts 34 pass through openings 38 in the splitter vane 28 to which the posts are welded at this end to the splitter vane Further, the posts 34 are surrounded by tubes 46 which are shaped to minimize the resistance to flow within the draft tube 24.

In the embodiment shown, the trailing edge 40 of the splitter vane 28 has two recessed apertures 42. The recessed apertures 42 are mounted to receive in mounting relationship therewith a corresponding concrete pier 44 extending from the draft tube 24.

Figure 5:
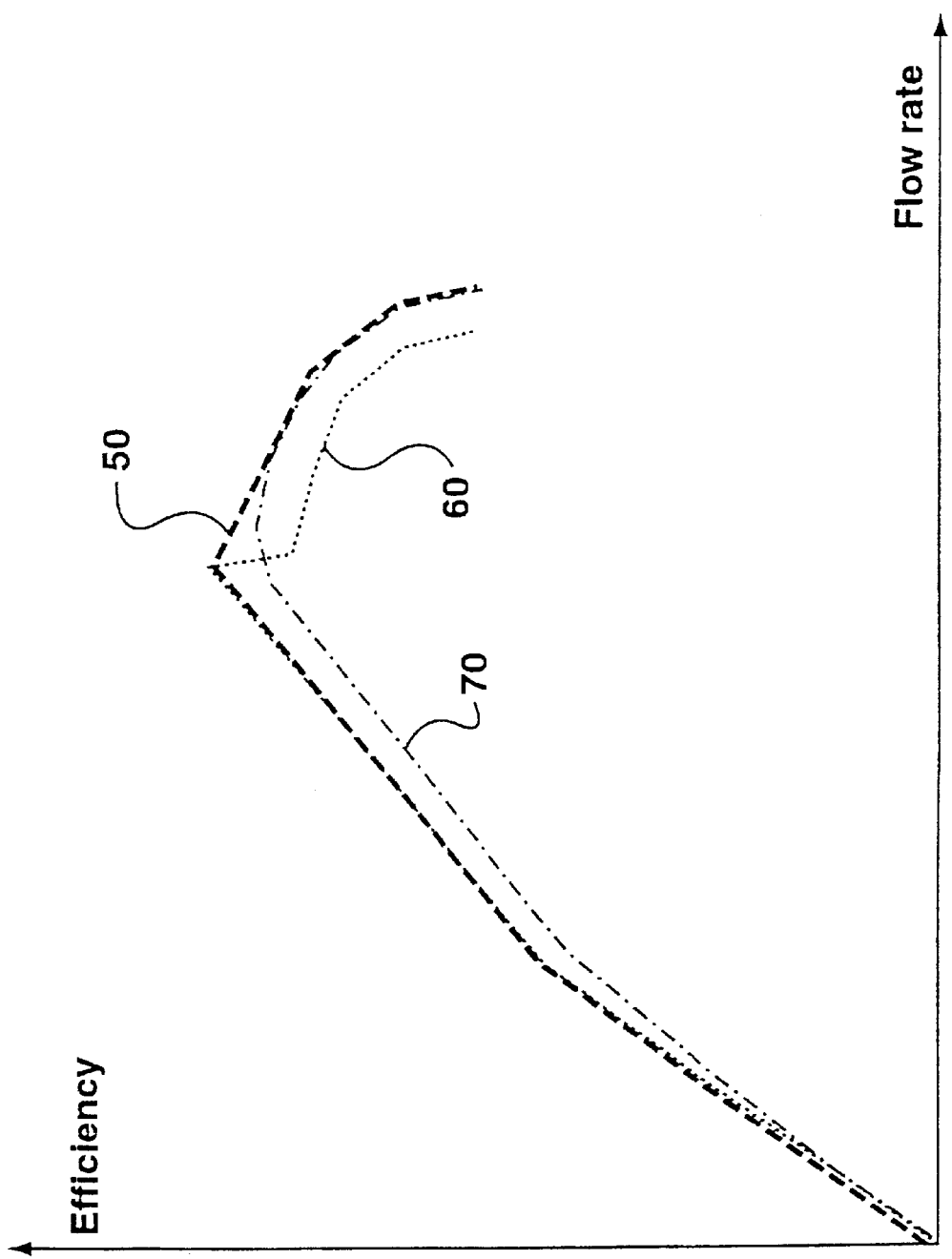
FIG. 5 is a graph illustration the typical efficiency versus flow rate curve for a reaction hydraulic turbine at a given head.

Referring to FIG. 5, there is shown a graph of the efficiency of the turbine versus the flow rate for a given head. Curve 50 represents the partial splitter vane 28 of the present invention. Curve 60 represents a draft tube 24 without the use of a splitter vane. Curve 70 represents the use of a conventional splitter vane that would extend across the entire width of the draft tube 24. This graph illustrates that the partial splitter vane curve 50 has the advantages associated with the conventional splitter vanes at peak flow rates and has an improved efficiency over the use of a conventional splitter vane at flow rates below peak flow rates. This latter performance improvement is due to the partially splitter vane 24 being spaced from the side walls 32 of the draft tube 24 to allow the swirling flow within the draft tube to proceed through the draft tube 24 with reduced interference.

It will be appreciated that alternative embodiments falling within the scope of the present invention may be apparent to those skilled in the art of refrigerator door construction and accordingly the present invention should not be limited to those embodiments herein described.

What is claimed is:

1. A draft tube for use in a turbine having a turbine runner, the draft tube comprising:
   side walls having an inlet for positioning adjacent the turbine runner and an outlet defining a flow exit for the turbine, the side walls of the draft tube diverging in width between the inlet and the outlet;
   a curved elbow to position the outlet substantially perpendicular to the inlet; and,
   a splitter vane mounted within the draft tube extending about the elbow and partially extending across the width of the draft tube to redirect flow about said elbow in the draft tube, the splitter vane having opposing side edge surfaces spaced from the side walls to permit swirling flow around the splitter vane within the draft tube.

2. The draft tube of claim 1 wherein splitter vane extends across less than about 80% of the width of the draft tube.

3. The draft tube of claim 2 wherein the opposing side edge surfaces of the splitter vane diverge from one another in the direction of flow towards the outlet.

4. The draft tube of claim 1 wherein the width of the splitter vane extends between 50 and 80 percent of the width of the draft tube.

5. The draft tube of claim 1 wherein the draft tube includes a plurality of support posts embedded at one end in the draft tube and connected at the other end to position the sputter vane in non-contacting relation with the walls of the draft tube.

6. The draft tube of claim 5 wherein the support posts are surrounded by tubes shaped to minimize the effects of the posts on the flow within the draft tube.

7. The draft tube of claim 5 wherein the support posts are mounted to a lower surface of the sputter vane.

8. The draft tube of claim 1 wherein the draft tube includes at least one pier adjacent the outlet extending into the draft tube, the draft tube further including a plurality of support posts embedded at one end in the draft tube and connected at the other end to position the splitter vane in the draft tube, the splitter vane further including at least one pier receiving recess adapted to receive the pier and to support the splitter vane on the pier.

9. The draft tube of claim 8 wherein the support posts are surrounded by tubes shaped to minimize the effects of the posts on the flow within the draft tube.

10. The draft tube of claim 9 wherein the support posts are mounted to a lower surface of the splitter vane.

11. The draft tube of claim 1 wherein the splitter vane is offset across the width of the draft tube.

12. A reaction hydraulic turbine comprising:
    a draft tube comprising side walls arranged to define an inlet and an outlet and an elbow arranged to position said outlet substantially perpendicular to said inlet;
    a turbine runner positioned adjacent said inlet and said outlet being arranged to define a flow exit;
    a splitter vane mounted within said draft tube to partially extend across a width of said draft tube, whereby flow is redirected about said elbow of said draft tube, said splitter vane comprising opposing side edge surfaces that are spaced from the side walls, whereby swirl flow is permitted around said splitter vane within said draft tube.

13. The reaction hydraulic turbine in accordance with claim 12, wherein said draft tube has a diverging width between said inlet and said outlet.

14. The reaction hydraulic turbine in accordance with claim 12, wherein said splitter vane extends across less than about 80% of the width of said draft tube.

15. The reaction hydraulic turbine in accordance with claim 12, wherein said opposing side edge surfaces of said splitter vane are arranged to diverge from one another in a flow direction toward said outlet.

16. The reaction hydraulic turbine in accordance with claim 12, wherein the width of said splitter vane extends between 50% and 80% the width of said draft tube and said opposing side edges are spaced substantially a same distance from respective adjacent side walls of said draft tube.

17. The reaction hydraulic turbine in accordance with claim 12, wherein said draft tube further comprises a plurality of support posts, in which one end of said plurality of support posts are embedded in said draft tube and an other end of said plurality of support posts are connected to said splitter vane to position said splitter vane in non-contacting relation with said side walls of said draft tube.

18. The reaction hydraulic turbine in accordance with claim 17, wherein said plurality of support posts are surrounded by tubes shaped to minimize effects of said plurality of posts on the flow within said draft tube.

19. The reaction hydraulic turbine in accordance with claim 17, wherein said support posts are mounted to a lower surface of said splitter vane.

20. The reaction hydraulic turbine in accordance with claim 12, further comprising:

at least one pier positioned adjacent said outlet and to extend into said draft tube;

a plurality of support posts having one end embedded in said draft tube and an other end connected to position said splitter vane in said draft tube;

said splitter vane further comprising at least one recess structured and arranged to receive said at least one pier, whereby said splitter vane is supported on said pier.

21. The reaction hydraulic turbine in accordance with claim 20, wherein said support posts are surrounded by tubes shaped to minimize effects of said posts on the flow within said draft tube.

22. The reaction hydraulic turbine in accordance with claim 20, wherein said support posts are mounted to a lower surface of said splitter vane.

23. The reaction hydraulic turbine in accordance with claim 12, wherein said splitter vane is mounted offset across the width of said draft tube.

24. An apparatus comprising:

an elbow tube having an inlet end and an outlet end;

a splitter vane comprising vane edges spaced from an interior surface of said elbow tube.

25. The apparatus in accordance with claim 24, wherein said elbow tube has an interior width that increases between said inlet and said outlet.

26. The apparatus in accordance with claim 24, wherein in a region of said splitter vane, a width of said interior surface increases.

27. The apparatus in accordance with claim 26, wherein said splitter vane is structured to substantially correspond to the width increase of said interior surface.

28. The apparatus in accordance with claim 24, wherein said splitter vane extends across less than 80% of an interior width in a region of said splitter vane.

29. The apparatus in accordance with claim 28, wherein said splitter vane extends across more than 50% of said interior width in said region of said splitter vane.

30. The apparatus in accordance with claim 24, wherein said vane edges are arranged to diverge from each other in a flow direction.

31. The apparatus in accordance with claim 24, further comprising at least one support post arranged to couple said splitter vane to said elbow tube.

32. The apparatus in accordance with claim 31, wherein said at least one support post is surrounded by a tube structured to minimize effects on a flow within said elbow tube.

33. The apparatus in accordance with claim 24, further comprising at least one pier coupled to an end of said splitter vane adjacent said outlet.

34. The apparatus in accordance with claim 33, wherein said at least one pier is structured and arranged to extend through said outlet.

35. The apparatus in accordance with claim 33, wherein said splitter vane comprises at least one recess structured and arranged to receive said at least one pier.

36. The apparatus in accordance with claim 35, further comprising at least one support post arranged to couple said splitter vane to said elbow tube.

37. The apparatus in accordance with claim 36, wherein said at least one support post is surrounded by a tube structured to minimize effects of on a flow within said elbow tube.

* * * * *